Patented Apr. 30, 1929.

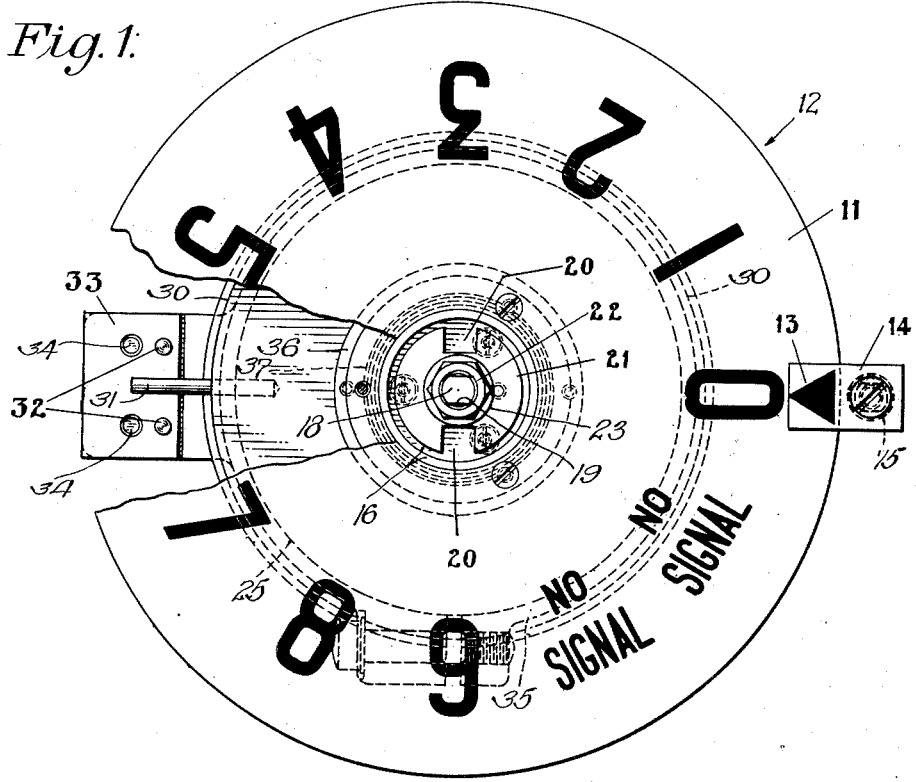
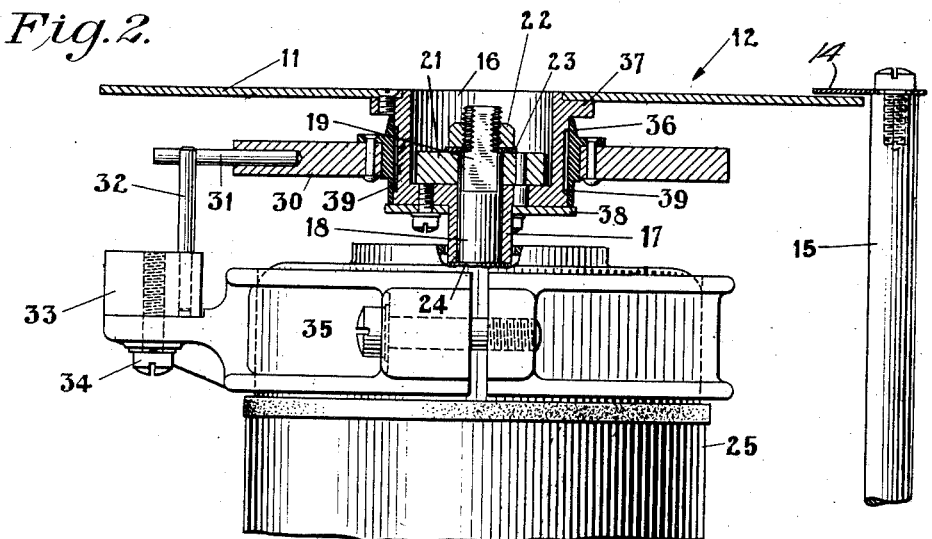

1,711,003

UNITED STATES PATENT OFFICE.

ARTHUR W. UHL, OF BROOKLYN, NEW YORK, ASSIGNOR TO FORD INSTRUMENT COMPANY, INC., OF LONG ISLAND CITY, NEW YORK, A CORPORATION OF NEW YORK.

DAMPING MEANS FOR INDICATORS.

Application filed September 16, 1924. Serial No. 738,110.

This invention relates to means for damping oscillations in electrical indicating instruments and more particularly to damping means for use with signalling systems in which the receivers turn in accordance with the turning of transmitters at distant points.

In a step-by-step transmission system the receiver indicator is turned through a comparatively small angle at any one time and the difficulty of bringing the indicator to rest in the proper position is not so great as in a system in which the receiver indicator may be moved substantially with the rotor of the transmitter. In a system such as that last-mentioned, the rotor of the transmitter may be given a considerable turn by one rapid movement, thus applying a considerable torque to the rotor of the receiver and causing such rotor to jump to its indicating position. In such a movement the receiver rotor acquires considerable momentum and will swing past the proper position and then vibrate back and forth between points on opposite sides of its proper position until it gradually comes to rest. In such a case it is desirable to provide damping means for bringing the receiver rotor to rest quickly.

An object of the invention is to provide damping means adapted for use with apparatus of the character specified.

Other objects of the invention are to provide damping means having provisions for lost motion; damping means equally effective in various positions of the receiver indicator; and friction damping means thrown into action when the indicator is turned out of a narrow range on opposite sides of its previous position.

These and other objects of the invention are attained by providing the receiver of a signalling system with a rotatable dial support having a friction drum, a friction ring surrounding said drum, and a lost motion connection between the ring and a fixed member.

While the invention is of general utility in connection with signalling systems of the character referred to above, it will by way of illustration be described in connection with a system known as the Selsyn system. A simple form of Selsyn system comprises a transmitter or generator and a receiver or motor, both of which are miniature polyphase alternators, the rotors of both generator and motor being provided with single-phase current and the stator winding of the generator being connected at certain points with corresponding points in the stator winding of the receiver motor. The operation of the transmitter and the receiver is, however, entirely different from that of alternators and resembles the operation of transformers and induction regulators.

The current in the transmitter rotor of such a Selsyn system causes different voltages to be set up at the connecting points in the transmitter winding. The values of these voltages are dependent upon the exact position of the rotor relative to the stator winding and may be changed by turning the rotor. When the rotor of the receiver is in a position corresponding to that of the transmitter, the same voltages are set up at the connecting points of the stator winding of the receiver as at the corresponding points of the stator winding of the transmitter. When, however, the transmitter rotor is turned, such voltages are changed at the points in the stator winding of the transmitter causing currents to flow through the connecting conductors and the receiver rotor is turned to a position corresponding to that of the transmitter rotor.

In the accompanying drawings:

Fig. 1 is a top plan view of a receiver with the invention applied thereto; and

Fig. 2 is an elevation partly in section.

A dial 11 of a receiver 12 is turned to different positions by means of a transmitter at a distant point and the position of the dial is indicated by the alignment of different symbols thereon with a pointer 13 on a plate 14 secured by a screw to the top of a fixed standard 15. The dial 11 is attached by suitable means such as screws to a cup shaped member 16 having at its bottom a sleeve 17 on a shaft 18 which has one or more flats 19 so that the shaft may be held against turning by a suitable implement having projections engaging notches or recesses 20 of a washer or member 21 fitted over the end of the shaft and engaging the flats thereof. Threaded on the reduced upper end of the shaft is a nut 22 which presses a washer 23 against the washer 21 and by pressing the lower end of the sleeve 17 against a shoulder 24 on the shaft 18 holds the dial 11 in position on the shaft. While the washer 21 is engaged by an implement such as mentioned above, the nut 22 may be turned by means of a suitable socket wrench.

The shaft 18 is connected with the rotor of a Selsyn receiver 25. When the transmitter is turned from one position to another, a torque is applied to the receiver rotor to turn it to a corresponding position. The rotor, however, usually acquires considerable momentum, especially when it is turned by a single rapid movement of the transmitter through a considerable angle, and acquires a hunting movement or a movement back and forth to opposite sides of the proper position.

To avoid such hunting movements and to bring the receiver to rest as soon as possible after a movement of the transmitter provision is made of damping means. In the illustrated form of the invention such damping means comprises a disk 30 frictionally mounted on the cup portion of the member 16 which serves as a friction drum and a member or pin 31 projecting from the disk between two posts or pins 32 mounted in a block 33 secured by screws 34 to an ear projecting from a band 35 clamped on the casing of the Selsyn receiver 25.

The connection between the disk 30 and member 16 includes a sleeve or ring 36 of friction material attached by suitable means or rivets to the disk and engaging the member 16 adjacent a flange 37 thereon and adjacent a plate 38 secured to the member 16 at the bottom of the cup or drum and engaging the lower edge of the ring 36 to hold it in position. The cup-shaped member 16 is cut away around its periphery to form a channel 39, thereby reducing the area of engagement between the member 16 and the ring 36, and the contacting surfaces are so designed that the braking effect will be the same whether the dial is in vertical or horizontal position.

The operation of the device is substantially as follows: When the transmitter is turned to a new position the disk 30 moves with the dial 11 until the pin 31 strikes one of the posts 32. The disk 30 will then be checked and the dial 11 will be moved with reference thereto against the frictional resistance developed between the member 16 and the ring 36. When the dial is stopped, it will have moved past the indicating position and in returning, will move without such frictional resistance until the pin 31 strikes the opposite post. As the oscillation of the dial 11 is decreased to a sufficient extent, the pin will merely move idly back and forth between the posts 32. It will be seen that when the oscillations of the dial are sufficiently great a braking or damping effect will be produced except within a narrow range adjacent the middle point of the oscillations and within narrow ranges as the dial begins a return movement from an extreme point at the end of an oscillatory movement, and that when the range of oscillation is sufficiently reduced, there will be no damping and the pin 31 will merely swing back and forth idly between the posts 32 until the dial 11 comes to rest.

While a preferred embodiment of the invention has been shown and described, it will be understood that it may be embodied in other forms and that various changes in the structural details may be made without departing from the principle of the invention as defined in the appended claims.

I claim:

1. In a receiver adapted for inclusion in an electrical signal system and having a shaft subject to hunting tendencies, the combination with a movable indicator partaking of the hunting tendencies, of a support therefor comprising a rotatable member rigidly secured to said shaft forming a hub for said indicator and a friction drum; a friction ring embracing said drum, a retainer for said ring removably attached to said drum, and lost motion means for limiting the movement of said friction ring with said drum.

2. In a receiver adapted for inclusion in an electrical signal system and subject to hunting tendencies, the combination with a movable indicator partaking of the hunting tendencies, a drum movable therewith and having portions of different diameters, a friction ring slipped over and engaging certain of said portions of said drum, a removable retainer for said ring attached to said drum, and means including two stops and a member movable back and forth therebetween to effect a lost motion connection with a fixed part.

3. In a receiver adapted for inclusion in an electrical signal system and subject to hunting tendencies, the combination with a movable indicator partaking of such hunting tendencies, a drum movable therewith, a friction ring on said drum, the drum and ring having intermediate portions out of contact so that the engagement therebetween is limited to the edges of said ring.

4. In a receiver adapted for inclusion in an electrical signal system and subject to hunting tendencies, the combination with a movable indicator partaking of such hunting tendencies, a drum movable therewith, a friction ring on said drum, the drum having portions out of contact so that the engagement therebetween is limited to the edges of said ring, and the engaging portions of said ring and drum having a relative disposition so that the braking effect will be the same irrespective of the horizontal or vertical position of the indicator.

In testimony whereof I affix my signature.

ARTHUR W. UHL.